US011082122B2

(12) United States Patent
Alford et al.

(10) Patent No.: US 11,082,122 B2
(45) Date of Patent: Aug. 3, 2021

(54) FREQUENCY TRANSLATING BI-DIRECTIONAL AMPLIFIER

(71) Applicant: RF Industries Pty Ltd, Seven Hills (AU)

(72) Inventors: Scott Hayden Alford, Bayswater (AU); Michael Leigh Beard, Allenby Gardens (AU); Jeko Zaprianov Grozev, Allenby Gardens (AU)

(73) Assignee: RF Industries Pty Ltd, Seven Hills (AU)

( * ) Notice: Subject to any disclaimer, the term of this patent is extended or adjusted under 35 U.S.C. 154(b) by 24 days.

(21) Appl. No.: 16/123,380

(22) Filed: Sep. 6, 2018

(65) Prior Publication Data

US 2019/0103910 A1 Apr. 4, 2019

Related U.S. Application Data

(60) Provisional application No. 62/567,405, filed on Oct. 3, 2017.

(51) Int. Cl.
*H04B 7/155* (2006.01)
*H04W 72/04* (2009.01)
*H04W 88/08* (2009.01)

(52) U.S. Cl.
CPC ..... *H04B 7/15507* (2013.01); *H04B 7/15542* (2013.01); *H04W 72/042* (2013.01); *H04W 88/08* (2013.01)

(58) Field of Classification Search
CPC .......... H04B 7/15507; H04B 7/15542; H04W 72/042; H04W 88/08
See application file for complete search history.

(56) References Cited

U.S. PATENT DOCUMENTS

| 8,787,827 | B2 | 7/2014 | Voskulen et al. |
| 2010/0199316 | A1* | 8/2010 | Clarniello ............... H04H 60/91 725/62 |
| 2014/0266425 | A1* | 9/2014 | Ashworth .......... H04B 7/15535 330/124 R |

* cited by examiner

*Primary Examiner* — Pao Sinkantarakorn
*Assistant Examiner* — Kabir U Jahangir
(74) *Attorney, Agent, or Firm* — Muncy, Geissler, Olds & Lowe, P.C.

(57) ABSTRACT

A frequency translating bi-directional amplifier (10) for extending radio coverage for digital mobile radio communication devices (200) on a trunked network using a digital modulation scheme, comprising: a field programmable gate array (FPGA) with local controller (CPU) and firmware (22) configured to analyse control channel messages of a downlink control channel and modify the control channel messages of the downlink control channel that contain traffic channel information; and an antenna (12) to transmit the modified control channel messages to the digital mobile radio communication devices (200) in order to change an operating frequency of the digital mobile radio communication devices (200) to use a predetermined set of frequencies that are repeatable by the bi-directional amplifier (10); wherein the operating frequency between the digital mobile radio communication devices (200) and the bi-directional amplifier (10) is different to an operating frequency between a donor base station (300) and the bi-directional amplifier (10).

17 Claims, 8 Drawing Sheets

DOWNLINK CONTROL CHANNEL MESSAGES

| Message | Description | Additional Info |
|---|---|---|
| ADJ_STS_BCST | Adjacent Status Broadcast | Informs MSs of adjacent BSSs and their CCs for roaming purposes. When the BSS lists the BDA as an ADJ in this respect, the BDA's CC number is replaced with the DBS CC number. |
| GRP_V_CH_GRANT | Group Voice Channel Grant | Informs MSs that a voice service for a specific talk group has been assigned to a specific network TC. Replace the network TC number with an available BDA TC number. |
| GRP_V_CH_GRANT_UPDT | Group Voice Channel Grant Update | Informs MSs of up to two talk group calls in progress, of particular relevance to late entry MSs (just entering area or just powering up). Replace the channel numbers of the network TCs allocated to the talk group calls with the channel numbers of the BDA TCs processing the calls. |
| GRP_V_CH_GRANT_UPDT_EXP | Group Voice Channel Grant Update Explicit | As per GRP_V_CH_GRANT but for a single talk group call with explicit transmit and receive frequency assignments. Replace the network TC frequencies allocated to the talk group call with the frequencies of the BDA TC processing the call. |
| IDEN_UP | Identifier Update | Informs MSs of the channel parameters to associate with a specific channel identifier, such as bandwidth, transmit offset, channel spacing & base frequency. This applies to network frequency bands other than VHF & UHF (138 - 122 MHz, 380 - 512 MHz respectively). | If the BDA is transferring to a band other than the network band, the transmit offset, channel spacing & base frequency will be modified accordingly. |
| IDEN_UP_TDMA | Identifier Update for TDMA | As per IDEN_UP but for networks utilizing TDMA channels in any frequency bands. | As per IDEN_UP |
| IDEN_UP_VU | Identifier Update for VHF/UHF | As per IDEN_UP but for VHF & UHF networks. | As per IDEN_UP |
| NET_STS_BCST | Network Status Broadcast | Informs MSs of the network's System and Wide Area Communications Network (WACN) IDs. | Replace the network Primary CC number with the BDA's Primary CC number. |
| BFS_STS_BCST | BFS Status Broadcast | Informs MSs of the network's current RF BSS system and site IDs. | As per NET_STS_BCST |
| SCCB | Secondary Control Channel Broadcast | Informs MSs of current secondary CCs at the BSS site. | Replace the network secondary CC number with the BDA's Secondary CC number. |
| SCCB_EXP | Secondary Control Channel Broadcast Explicit | As per SCCB but for networks utilizing explicit transmit and receive frequency assignments. | As per SCCB |
| U_V_CH_GRANT | Unit to Unit Voice Channel Grant | Indicates the network TC assignment for a requested voice service call between individual MSs. | Replace the network TC number with an available BDA TC number. |
| UU_V_CH_GRANT_UPDT | Unit to Unit Voice Channel Grant Update | Updates the network TC assignment to MSs currently on an individual voice service call. | As per UU_V_CH_GRANT |
| TELE_INT_CH_GRANT | Telephone Interconnect Voice Channel Grant | Informs an MS of the network TC assignment for a requested telephone interconnect call. | Replace the network TC number with an available BDA TC number. |
| TELE_INT_CH_GRANT_UPDT | Telephone Interconnect Voice Channel Grant Update | Updates the network TC assignment to an MS currently on a telephone interconnect call. | As per TELE_INT_CH_GRANT |
| SN-DATA_CHN_GNT | SNDCP (Packet) Data Channel Grant | Informs an MS of the network TC explicit transmit and receive frequency designations for an individual data service request assigned by either the Fixed Network Equipment (FNE) or the Mobile Radio Controller (MRC). | Replace the network TC frequencies with the frequencies of the BDA TC processing the data service. |
| SN-DATA_CHN_ANN_EXP | SNDCP Data Channel Announcement | Indicates the network TC explicit transmit and receive frequency assignments and access permissions to MS data access control groups. | As per SN-DATA_CHN_GNT |

Notes:
MS = Mobile Subscriber Unit (mobile radio communication device)
BSS = Source Base Station Transceiver
ADJ = Adjacent Base Station Transceivers (note that the DBS will have the BDA listed as an ADJ)
CC = Control Channel
TC = Traffic Channel

Figure 4

Example:
Modifications of a Group Voice Channel Grant (GRP_V_CH_GRANT) message to change channel number 123 to channel number 456, without changing frequency bands. The bits that have changed are in red text. Note that the TSBK CRC parity check needs to be recalculated and changed as well.

| | GRP_VOICE_CHANNEL_GRANT | | | | | | | | | | | | | | | | | |
|---|---|---|---|---|---|---|---|---|---|---|---|---|---|---|---|---|---|---|
| Octet 0 | LB | P | Opcode | | | | | | 0 | 0 | 0 | 0 | 0 | 0 | 0 | 0 | | |
| Octet 1 | Manufacturer's ID | | | | | | | | 0 | 0 | 0 | 0 | 0 | 0 | 0 | 0 | | |
| Octet 2 | Service Options | | | | | | | | 0 | 0 | 0 | 0 | 0 | 0 | 0 | 0 | | |
| Octet 3 | Channel Identifier | | | | | | | | 0 | 0 | 0 | 0 | 1 | 0 | 0 | 0 | | |
| Octet 4 | Channel Number | | | | | | | | 0 | 0 | 0 | 0 | 0 | 0 | 1 | 1 | | |
| Octet 5 | Group Address | | | | | | | | 0 | 0 | 0 | 1 | 1 | 0 | 0 | 1 | | |
| Octet 6 | | | | | | | | | 1 | 0 | 1 | 1 | 1 | 0 | 0 | 1 | | |
| Octet 7 | Source Address | | | | | | | | 1 | 0 | 1 | 1 | 1 | 0 | 1 | 1 | | |
| Octet 8 | | | | | | | | | 0 | 0 | 0 | 1 | 1 | 0 | 0 | 0 | | |
| Octet 9 | | | | | | | | | 1 | 1 | 0 | 1 | 0 | 1 | 0 | 0 | | |
| Octet 10 | Trunking Signaling Block (TSBK) Cyclic Redundancy Check (CRC) | | | | | | | | 0 | 1 | 1 | 1 | 0 | 1 | 0 | 0 | | |
| Octet 11 | | | | | | | | | 1 | 1 | 1 | 1 | 1 | 1 | 1 | 1 | | |

Notes:
LB = Last Block Flag
P = Protected Trunking Block Flag

FREQUENCY TRANSLATING BI-DIRECTIONAL AMPLIFIER

FIELD OF THE INVENTION

The present invention relates to a frequency translating bi-directional amplifier and a method for extending radio coverage for digital mobile radio communication devices on a trunked network using a digital modulation scheme.

BACKGROUND TO THE INVENTION

Bi-directional amplifiers (BDAs), or repeaters, are commonly used for in-fill coverage or range extension in land mobile radio (LMR) networks. Typically, a BDA will receive a signal from a donor base station transmitter, boost the signal level, and retransmit the signal to mobile receivers lying within a designated area that would otherwise have weak or non-existent direct coverage from the donor base station transmitter. This sequence is commonly referred to as signal boosting in the "downlink" path (from "donor" side to "coverage" side). Conversely, a BDA will receive a signal from a mobile transmitter within the designated area, boost the signal level, and retransmit the signal back to the donor base station receiver (commonly referred to as the "uplink" path). Typical examples of the use of BDAs are to provide radio coverage into vehicular tunnels, underground car parks, shopping centres, or to extend the coverage area of an existing radio site.

A BDA is disclosed in the applicant's U.S. Pat. No. 8,787,827, which is hereby incorporated by reference herein in its entirety.

BDAs can either be non-frequency-translating or frequency-translating. A non-frequency-translating BDA will maintain the same donor site frequencies in both the downlink and uplink paths, whereas a frequency-translating BDA will convert the boosted output signal to a frequency that is different to the input frequency. Typically in either frequency-translating or non-frequency-translating modes, the downlink frequencies will be different to the uplink frequencies in any case.

The deployment of a non-frequency-translating BDA in a typical range extension application demands that careful attention be given to the selection and placement of uplink (donor side) and downlink (coverage side) antennas. Sufficient RF (radio frequency) isolation must exist between these antennas otherwise the BDA will feed back on itself in both the uplink and downlink directions, due to the fact that in each of these directions, both the received signal at the input to the BDA and the boosted signal at the output of the BDA are at the same frequency. The gain of the BDA, in either uplink or downlink directions, is typically limited to be 15 dB or so less than the level of RF isolation that exists between the uplink and downlink antennas to avoid feedback. Hence, the maximum output power of the boosted signal is also limited, since in most cases the output power level is equal to the input power level plus gain.

Non-frequency-translating BDA applications are consequently best suited to in-building or tunnel type coverage enhancement, where, by virtue of the shielding effect of the structure that exists between the externally-placed uplink antenna and the internally-placed downlink antenna (or distributed antenna system), a good degree of RF isolation is achieved thus enabling high gain, high power operation.

The gain limitation associated with non-frequency-translating BDA applications is non-existent in the case of frequency-translating BDAs, since the input and output frequencies are different; the channelizing filters that exist in the BDA input stages ensure that the level of any output signal that prevails in these stages is heavily attenuated. A frequency-translating BDA can therefore be more easily deployed with high-powered outputs in both the uplink and downlink directions, and furthermore the selection and placement of antennas is far less critical.

Open-area coverage extension or infill applications generally necessitate high gain, high power BDAs in order to be effective. In these cases, it is difficult to get adequate antenna isolation and thus frequency translating BDAs are required. The configuration of the BDA deployment that provides the solution to the coverage extension requirement will depend on the operational protocols of the radio network to which the donor site's base station radio (transceiver) is connected.

LMR (Land Mobile Radio) networks are typically configured as either conventional or trunked networks. Networks serving a large group of users are typically trunked, whereas small user-group networks are typically conventional. The key differences between the two network types are that in conventional networks, radio site channels are selected by the user; a dedicated radio site channel is used for each group of users; and the number of users that can be supported is directly proportional to the number of channels available at the radio site. In trunked networks, each radio site is connected to a centralized network controller; each radio site has a dedicated control channel; each radio site has a pool of "traffic" channels; traffic channels are assigned to the users by the network controller without user intervention; and the number of users that can be supported is exponentially proportional to the number of channels available at the radio site.

Figure 8:
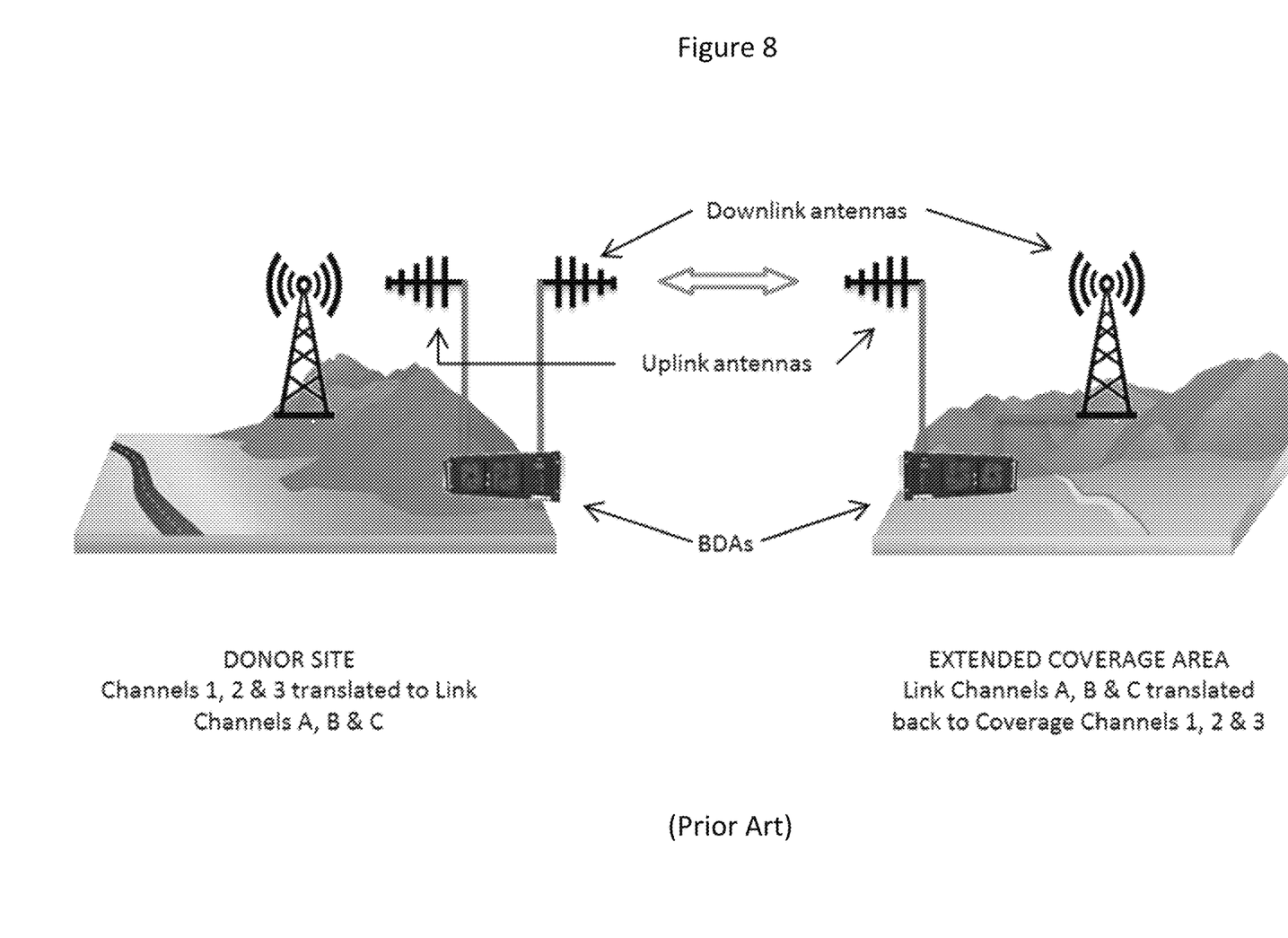
FIG. 8 is a diagram depicting a prior art double translation process using two BDAs.

A double translation process using two BDAs is used in circumstances where network protocols are incompatible with frequency translation and require that the rebroadcasted coverage channels be restored to the original donor site channels. The second BDA is located at the donor site and is either directly connected to the donor site's radio network via a hardwired connection, or connected over the air via a separate, local uplink antenna. The channels are translated to non-network-related link channels by the first BDA located in the donor site area, and this translation is then reversed by the second BDA serving the extended coverage area. A double translation is thus necessary in this circumstance. See FIG. 8.

Double translation using two BDAs has some significant shortcomings, There is additional cost compared to a single-translation arrangement because of the additional BDA, and consequently additional installation and servicing costs and the cost of associated infrastructure required at the donor site. Another disadvantage of double translation using two BDAs is that the additional BDA introduces a further signal propagation delay which adds to the RF propagation delay between the donor and remote coverage sites. This may likely result in the overall propagation delay between the donor site transceiver and the mobile handset exceeding the operational limit of the network protocol, causing a reduction in the maximum distance that can be tolerated between the donor site and remote coverage site when using double translation with two BDAs.

SUMMARY OF THE INVENTION

The inventive concept arises from a recognition that a single-translation solution is more desirable than a double-translation solution for a trunked network using a digital modulation scheme.

The present invention, in one aspect, comprises a method for extending radio coverage for digital mobile radio communication devices on a trunked network using an APCO Project 25 (P25) digital modulation scheme; the trunked network including a donor base station and a bi-directional repeater device. The method comprises analysing control channel messages of a downlink control channel. The method also comprises modifying the control channel messages of the downlink control channel that relate to traffic channel information. The method also comprises transmitting the modified control channel messages to the digital mobile radio communication devices in order to change an operating frequency of the digital mobile radio communication devices to use a predetermined set of frequencies that are repeatable by the repeater device. The operating frequency between the digital mobile radio communication devices and the repeater device is different to an operating frequency between the donor base station and the repeater device.

The control channel messages of the downlink control channel may include: Adjacent Status Broadcast, Group Voice Channel Grant, Group Voice Channel Grant Update, Group Voice Channel Grant Update Explicit, Identifier Update, Identifier Update For TDMA, Identifier Update For VHF/UHF, Network Status Broadcast, RFSS Status Broadcast, Secondary Control Channel Broadcast, Secondary Control Channel Broadcast Explicit, Unit To Unit Voice Channel Grant, Unit To Unit Voice Channel Grant Update, Telephone Interconnect Voice Channel Grant, Telephone Interconnect Voice Channel Grant Update, SNDCP Data Channel Grant, or SNDCP Data Channel Announcement.

The repeater device may be a bi-directional amplifier (BDA).

The method may further comprise storing a predetermined set of talk group and subscriber identities in the repeater device.

The method may further comprise periodically broadcasting control channel frequencies that are available for roaming purposes.

The repeater device may have a maximum of 12 bi-directional channels including 1 control channel and 11 traffic channels.

The control channel messages that relate to traffic channel information may include control channel messages that relate to traffic channel frequency allocation, talk group operations, unit-to-unit calls, telephone-interconnect calls, and data service requests.

The present invention, in another aspect, comprises a frequency translating bi-directional amplifier for extending radio coverage for digital mobile radio communication devices on a trunked network using an APCO Project 25 (P25) digital modulation scheme. The bi-directional amplifier comprises a field programmable gate array (FPGA) with a local controller (CPU) and firmware configured to analyse control channel messages of a downlink control channel and modify the control channel messages of the downlink control channel that relate to traffic channel information. The bi-directional amplifier also comprises an antenna to transmit the modified control channel messages to the digital mobile radio communication devices in order to change an operating frequency of the digital mobile radio communication devices to use a predetermined set of frequencies that are repeatable by the bi-directional amplifier. The operating frequency between the digital mobile radio communication devices and the bi-directional amplifier is different to an operating frequency between a donor base station and the bi-directional amplifier.

The frequency translating bi-directional amplifier may further comprise a memory configured to store a predetermined set of talk groups and subscriber identification numbers.

The frequency translating bi-directional amplifier may further comprise firmware configured to continuously monitor the downlink control channel from the donor base station.

Control channel messages of the downlink control channel that relate to traffic channel information may include: GRP_V_CH_GRANT, GRP_V_CH_GRANT_UPDT, GRP_V_CH_GRANT_UPDT_EXP, UU_V_CH_GRANT, UU_V_CH_GRANT_UPDT, TELE_INT_CH_GRANT, TELE_INT_CH_GRANT_UPDT, SN-DATA_CHN_GNT and SN-DATA_CHN_ANN_EXP.

Other advantages and features according to the invention will be apparent to those of ordinary skill upon reading this application.

BRIEF DESCRIPTION OF THE DRAWINGS

Embodiments of the invention will be described with respect to the figures, in which like reference numbers denote like elements and in which.

DETAILED DESCRIPTION OF THE INVENTION

Figure 1:
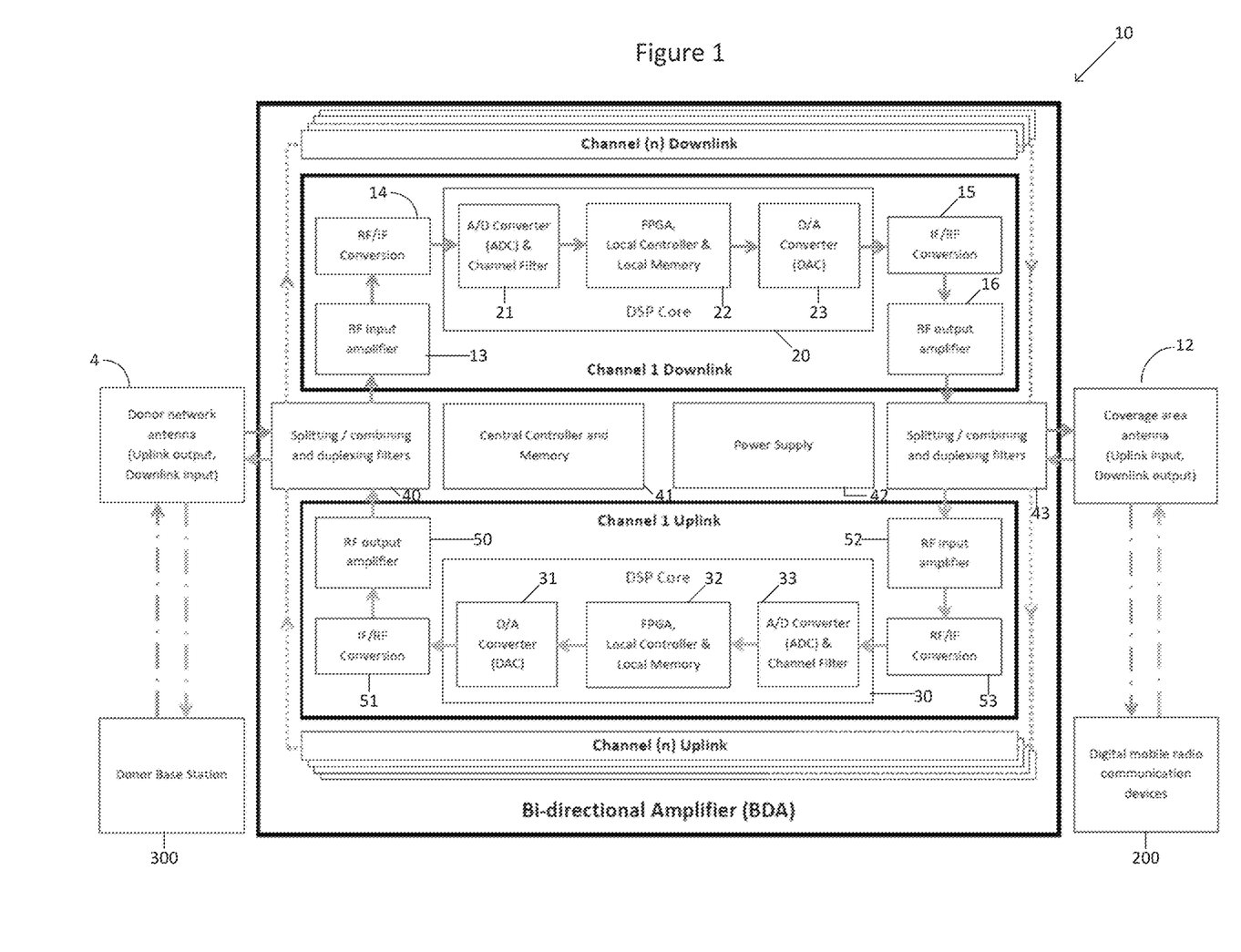
FIG. 1 is a block diagram of a bi-directional amplifier (BDA) in accordance with a preferred embodiment of the present invention.

A preferred frequency translating bi-directional amplifier (BDA) according to the present invention is illustrated in FIG. 1 and shown generally at reference numeral 10. The BDA 10 extends radio coverage for digital mobile radio communication devices 200 on a trunked network using a digital modulation scheme. The trunked network includes a donor base station 300 and the BDA 10. In a preferred embodiment, the BDA 10 enables network operability to be maintained where a single-frequency-translation BDA or repeater is used. In one embodiment, a single BDA 10 can advantageously extend the radio coverage of the donor base station 300 for digital mobile radio communication devices 200 including APCO Project 25 (P25) radios and handheld mobiles in remote or blind spot areas. A pre-defined set of APCO Project 25 (P25) talk groups and subscriber IDs are stored in a memory 41 of the BDA 10. Extended coverage is provided for these talk groups and subscriber IDs of subscribers with the option for an "allow all" pass through mode. The following use cases are also provided for: (1) low traffic areas—a small number of channels for the BDA 10 are provided, and all other base station traffic is ignored, thus reducing the number of required transmitter resources; (2) translating base station repeater—all base station channels are repeated via frequency translation in the BDA 10.

Generally, the BDA 10 analyses control channel messages of a downlink control channel. After analysis, the BDA 10 modifies the control channel messages of the downlink control channel that relate to traffic channel information. These control channel messages of the downlink control channel relate to traffic channel frequency allocation, talk group operations, unit-to-unit calls, telephone-interconnect calls, and data services. After modification, the BDA 10 transmits the modified control channel messages to the digital mobile radio communication devices 200 in order to change an operating frequency of the digital mobile radio communication devices 200 to use a predetermined set of frequencies that are repeatable by the BDA 10. The operating frequency between the digital mobile radio communication devices 200 and the BDA 10 is different to an operating frequency between the donor base station 300 and the BDA 10.

Control channels at each radio site in a trunked network are constantly transmitting outbound signalling data generated by the network controller 300. The controller 300 communicates with mobile handsets 200 over these control channels. Each mobile handset 200 is programmed with a list of control channels that are relevant to the radio network and each handset 200 scans for the presence of one of these channels when it is in an idle state. The handset 200 will then lock on to the strongest control channel that it finds (which will typically be the channel at the geographically-nearest radio site), constantly listening to the outbound data messages. The mobile handset 200 also sends registration information back to the network controller 300 via the control channel, thereby letting the network controller 300 keep track of its location at all times.

Calls are initiated on the control channel. If a mobile handset 200 initiates a call, the network controller 300 will assign a traffic channel and instructs the handset to move to that traffic channel thereby freeing up the control channel once again. In particular, if a mobile handset 200 sends a request to initiate a call on a particular talk group, say talk group "A", the network controller 300 will allocate a site-specific traffic channel and instruct the handset 200 to move to it. The network controller 300 also allocates a site-specific traffic channel to each other member of talk group "A" and instructs those mobile handsets 200, which are currently listening to their respective site-specific control channels, to move to their allocated traffic channels. The network then establishes the call and routes the data packets (containing voice and/or other data) between these traffic channels. Once the call is terminated, the mobile handsets 200 revert back to listening on the control channel.

In order to maintain network operability for mobile handsets 200 operating within an extended coverage area created via a single-frequency-translating BDA 10, knowledge of the network instructions being communicated over the control channel between the network controller 300 and mobile handset 200 is important.

In one embodiment a channelized BDA 10 functions as a high gain, high power frequency-translating coverage-extension BDA 10. The BDA 10 is fitted with individual channel modules, tuned to the frequencies of the control and traffic channels at a specific donor site 300 in the downlink input stages and uplink output stages. The uplink input stages and downlink output stages are tuned to the frequencies of different network-compatible control and traffic channels. An initial configuration has a single control channel and the same number of traffic channels that exist at the donor site 300, and is configured in one embodiment to operate on an APCO Project 25 (P25) (Phase 1) network.

FIG. 1 depicts channel 1 of n downlink channels and channel 1 of n uplink channels for the BDA 10. The BDA 10 is operatively connected to a donor network antenna 4 to communicate with the donor base station 300 and a coverage area antenna 12 to communication with digital mobile radio communication devices 200. Splitting/combining and duplexing filters 40, 43 are provided to connect individual channel paths in the BDA 10. Combiners are connected to the uplink and downlink antennas and consist of RF filters in the form of a duplexer. These filter and separate the uplink and downlink paths given that the uplink and downlink frequencies for each channel are separated by a fixed frequency offset. The downlink path broadly consists of a sensitive RF input amplifier 13 which amplifies signals received by the uplink antenna 4 originating from the donor site 300. These amplified signals are mixed to an Intermediate Frequency (IF) by RF/IF conversion 14. The IF signals are then filtered using analogue techniques, or by using digital techniques after analogue to digital conversion and digital filtering by an A/D converter and channel filter 21 so as to select and isolate the channel to be processed.

For the downlink control channel, the filtered signal is then demodulated and decoded to retrieve the transmitted data stream. This data stream is intercepted, inspected and manipulated, and then encoded following which the control channel is remodulated back to an intermediate frequency (IF) with the newly encoded control channel data. The modulated IF signal is then converted to an analogue signal by the D/A converter 23, and then up-converted by an IF/RF up-converter 15 to a frequency-translated RF channel, which in this case is channel 11. This up-converted signal is then fed to a high powered output amplifier 16. The amplified signal is then fed out to the downlink antenna 12 via the combiner/duplexer 43 for transmission in the extended coverage area to the mobiles 200.

For the downlink traffic channels, the channelized IF signal does not need to be demodulated and is fed to the IF/RF up-converter 15 for conversion to a frequency-translated RF channel. The up-converted signals are then amplified and transmitted in a similar fashion to the control channel.

The process described above is repeated in the uplink direction.

In other configurations, the uplink control channel data may remain modulated (that is, the data stream will not be processed or manipulated in any way). In this case the processing path will be similar to a traffic channel.

In one embodiment, the BDA 10 is a DSP-based bi-directional amplifier (BDA) where the channelizing filters are applied in the digital domain by a digital signal processor (DSP) and is implemented in a Field Programmable Gate Array (FPGA) with local controller (CPU) and firmware 22. The FPGA with local controller (CPU) and firmware 22 is provided in a DSP core 20. The BDA 10 also has a power supply 42.

Advantageously, the BDA 10 analyses and (where appropriate), inspects and manipulates the data to provide resource management, network protocol and parameter learning, timing and synchronisation adjustment, logging of traffic and/or other network usage, and signal restoration.

Resource Management

The BDA 10 may not be equipped with the same number of traffic channels that are available at the donor site 300. In some instances, where a donor site 300 has excess capacity for example, the downlink control channel data may be manipulated in order to deploy a lesser number of traffic channels, and to facilitate a more efficient use of available resources thereby allowing the same traffic to be handled.

Analysis of both downlink and uplink control channel data allows the verification of talk group and/or individual identification information (such as Talk Group ID, Subscriber Unit ID) against a stored table of allowed ID's. Consequently, access to the communications network via the BDA 10 in the extended coverage area can be restricted to a subset of users, compared to the larger set of users accessing and consuming the available channel capacity of the donor site 300. The consumption of the available channel capacity in the extended coverage area may be managed accordingly, particularly where a lesser number of traffic channels are deployed in the BDA 10 compared to the donor site 300.

Analysis of both downlink and uplink control channel data allows the verification of talk group and/or individual identification information (such as Talk Group ID, Subscriber Unit ID) against a stored table of allowed ID's. Consequently, access to the communications network via the BDA in the extended coverage area can be restricted to a subset of users, compared to the larger set of users accessing and consuming the available channel capacity of the donor site. The consumption of the available channel capacity in the extended coverage area may be managed accordingly, particularly where a lesser number of traffic channels are deployed in the BDA compared to the donor site.

Network Protocol & Parameter Learning

The BDA 10 is provided with a plurality of software-defined profiles, each profile catering to a different network modulation protocol. Analysis of the downlink control channel data allows the BDA 10 to recognize the network protocol to which the donor site 300 belongs, and then partially or fully automatically configure itself to be compatible with the protocol.

Some of the individual network parameters within each network modulation protocol have variable settings which may be detailed and specific, and may only be known with a detailed knowledge of the modulation protocol. An analysis of the downlink control channel data allows the BDA 10 to recognize the particular setting that has been utilised in the network's deployment and to then automatically align itself to be compatible with the network parameters as configured.

The network protocol and parameter learning capability facilitates a quick and convenient setup and configuration process during the initial commissioning of the BDA 10 as a network coverage extension device. This learning capability also enables other post-commissioning BDA capabilities such as mode-reconfiguration in the event of a partial or full donor site failure; roaming for a secondary (or other back-up) control channel either from the original donor site 300 or from an alternate donor site; or any other reconfiguration-determining condition.

Timing and Synchronisation Adjustment

The BDA 10 may introduce an inevitable group delay to the rebroadcasted signal in both the downlink and uplink directions. This delay may cause the overall signal propagation delay between the donor site 300 and the mobile handset 200 to exceed the acceptable operational limits of the modulation protocol with respect to data packet timing and synchronisation requirements.

Analysis of the downlink control channel's data symbol rate allows the BDA 10 to extract timing information from which the BDA's internal reference frequency can be adjusted to accurately align with the donor site's base station transceiver's reference frequency. The disciplining of the BDA's internal reference frequency in this manner allows accurate timing and synchronisation alignment with the donor site 300. The data packets are then able to be manipulated and accurately delayed or otherwise moved in order to restore synchronisation with the donor site, thereby overcoming the propagation delay limitation. Furthermore, the realigned synchronisation will reduce the corruption and/or destruction of data thereby resulting in improved throughput efficiencies.

The symbol rate provides the timing but the data is read so that the instructions that are passed from the network controller 300 to the mobile handset 200 are intercepted and read by the BDA 10. An example of one such instruction is the "Goto channel ABC" that tells the mobile handset 200 to switch from the control channel to an allocated traffic channel. The BDA 10 intercepts the instruction/message and instead transmits a replacement message to the mobile handset 200 to switch to a different channel so that the BDA 10 translates the traffic channel frequency.

The downlink channel data/data stream and data packets are manipulated. Timing adjustment and removal of the network controller's message and insertion and transmission of a substitute message is performed by the BDA 10. All commands that are being sent by the network controller 300 are read, and if necessary to maintain compatibility with the network after the frequency translation, the BDA 10 replaces commands with a substitute message.

Logging of Traffic and/or Other Network Usage

Network traffic that is handled by the BDA 10 can be assessed by analysing the downlink and uplink control channel data. This allows accurate monitoring, logging and reporting of network usage statistics, including: all talk groups and mobile IDs that use the control channel; all call start and stop times for traffic through the BDA as well as all other traffic at the donor site; relevant call information, such as: originating caller, type of call (group or individual), destination caller or talk group, donor site channel, BDA channel, and priority; and time and date stamp of significant network events, such as: loss of control channel, secondary control channel usage, received signal strength low level failure, dropped data packets, substituted data packets, other data failures, and channel dumping for a higher priority user.

These statistics are an indication of network performance, network loading and user profiles and are very useful in assisting network operators in planning future network expansion and/or modifications.

Signal Restoration

The integrity of a radio signal is affected by many variables including atmospheric conditions, multipath fading, and interference from many sources. Invariably, network transmissions occurring between the donor site 300 and the BDA 10, or between the mobile handset 200 and the BDA 10, will suffer some degree of data symbol corruption.

The demodulation, decoding, encoding and remodulation process associated with the downlink and uplink control channels removes any data corruption that may have occurred, since the data symbols are reproduced at a digital (baseband) level, thereby restoring the integrity of the signal prior to retransmission.

Figure 7:
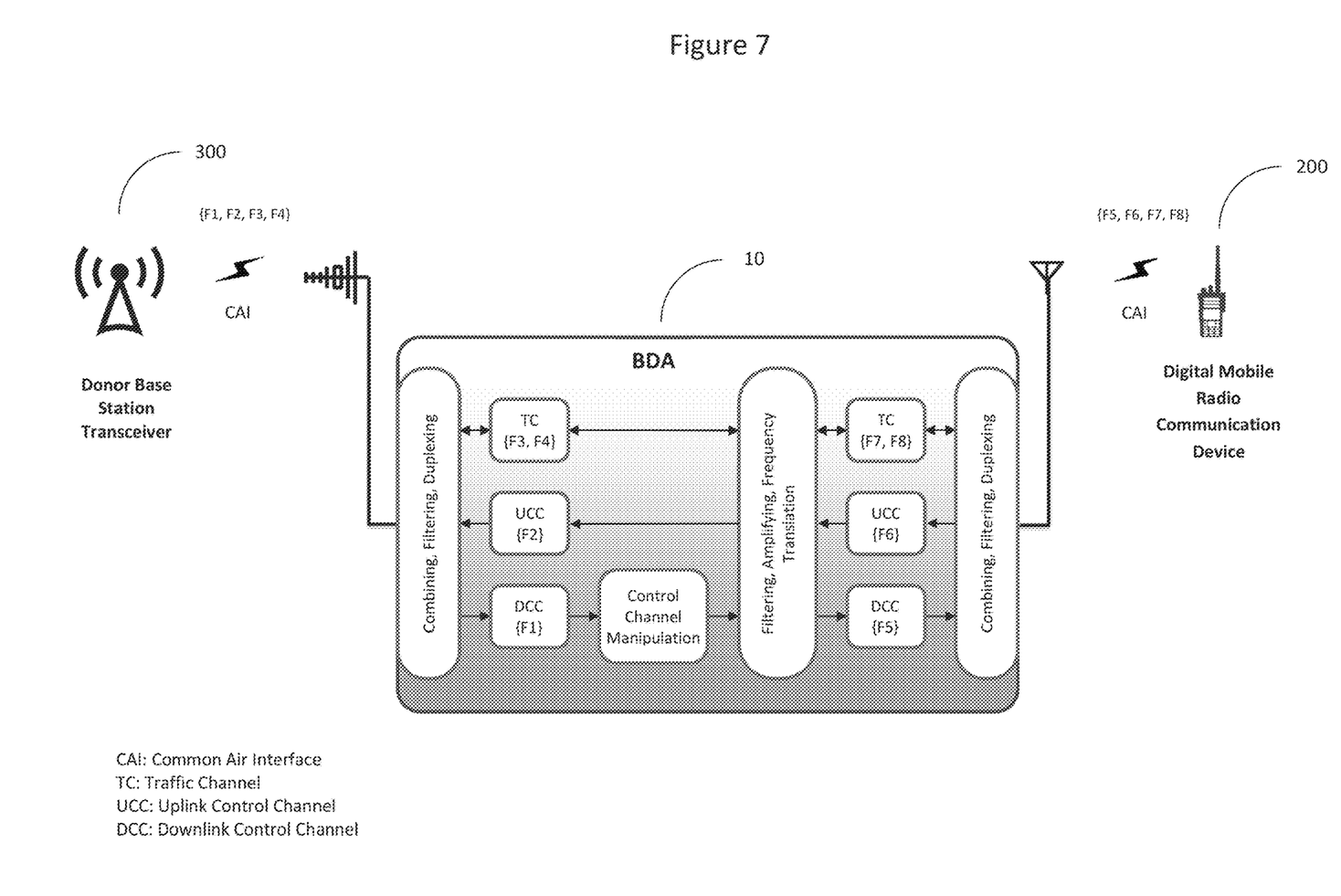
FIG. 7 is a functional block diagram for the BDA of FIG. 1.

Referring to FIG. 7, a functional block diagram for the BDA 10 is depicted. For simplicity, the diagram only shows the coverage for one talk group and one radio 200. The BDA 10 repeats (filters and amplifies) the traffic channels (TC) and the uplink control channel (UCC) without any change to the content of these channels except for frequency translation. The BDA 10 changes the content of the downlink control channel (DCC) for some messages (see FIG. 3) and then transmits the modified messages of the DCC to all radios 200 in the BDA's coverage area after filtering, amplification and frequency translation. The purpose of modifying the DCC messages is to change the operating frequency of radios 200 within the BDA' coverage area to use a pre-defined set of frequencies which the BDA 10 functionality has the capacity to repeat. The operating frequencies between the BDA 10 and the base station 300 (including the traffic control channels) are different to the operating frequencies between the BDA 10 and the radios 200, provided via frequency translation. Advantageously the BDA 10 does not suffer from simulcast interference and isolation issues between the donor 300 and BDA 10 coverage areas. There is also a reduction in required transmitter (Tx) resources for the coverage area. There is also a potential to only repeat necessary traffic, thus reducing the required number of channels for the BDA 10 to provide adequate and acceptable coverage.

In FIG. 7 for example, frequencies {f1, f2} for control channels between the BDA 10 and the base station 300 are changed to {f5, f6} for control channels between the BDA 10 and the APCO Project 25 (P25) radios 200. Frequencies {f3, f4} for traffic channels between the BDA 10 and the base station 300 are changed to {f7, f8} for traffic channels between the BDA 10 and the APCO Project 25 (P25) radios 200. Any APCO Project 25 (P25) radio 200 that enters the coverage area of the BDA 10 is configured to use the control channel frequencies (uplink and downlink) that the BDA 10 provides (f5, f6 in FIG. 7). The network is configured to include the BDA 10. The BDA control channel frequencies are periodically broadcast to ensure mobiles 200 can roam onto the BDA control channel. A list of pre-defined talk groups and subscriber IDs is stored in the BDA 10 that the BDA 10 provides coverage for.

Downlink Control Channel

Figure 3:
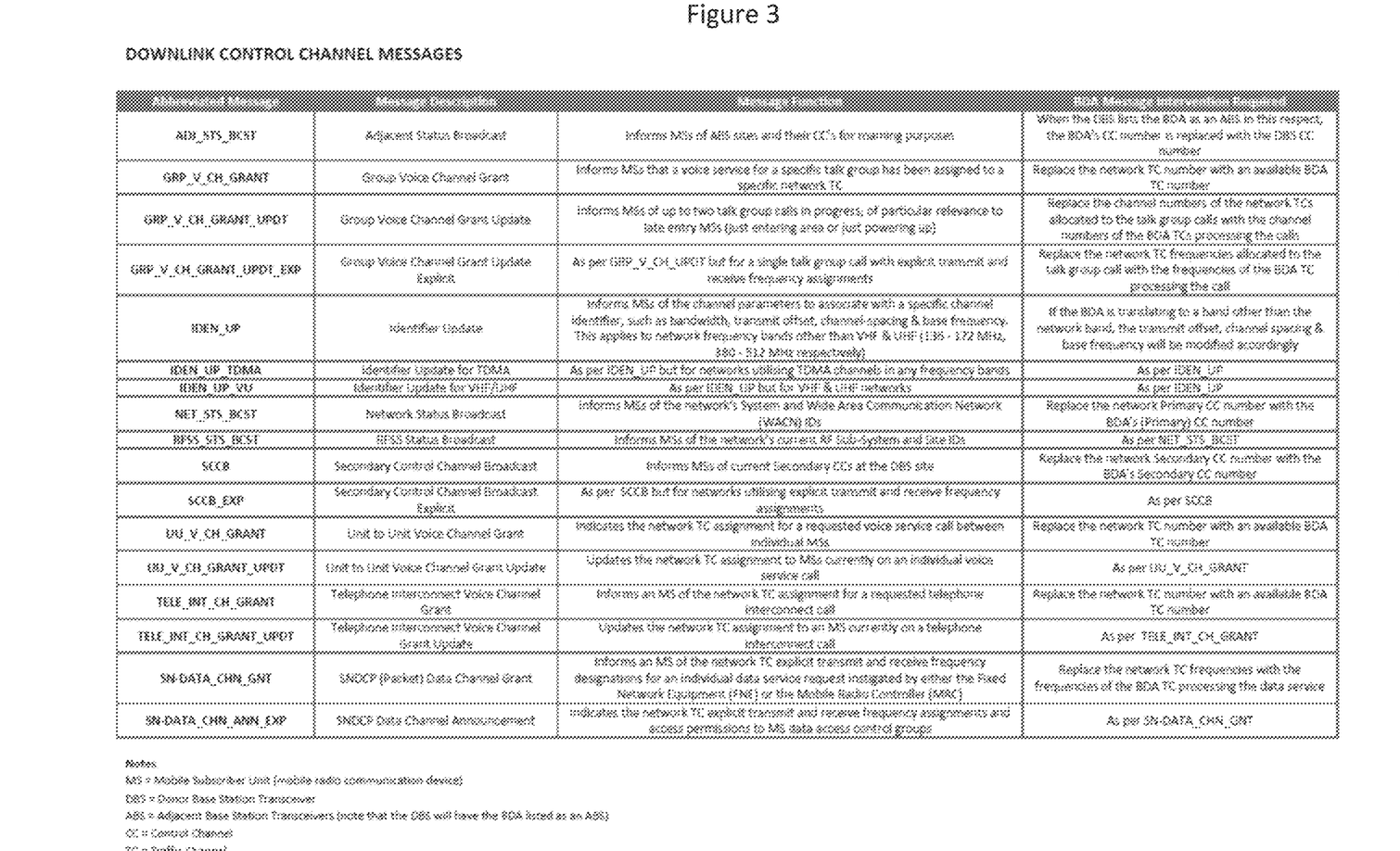
FIG. 3 is a table of downlink control channel messages that are modified by the BDA of FIG. 1.
Figure 4:
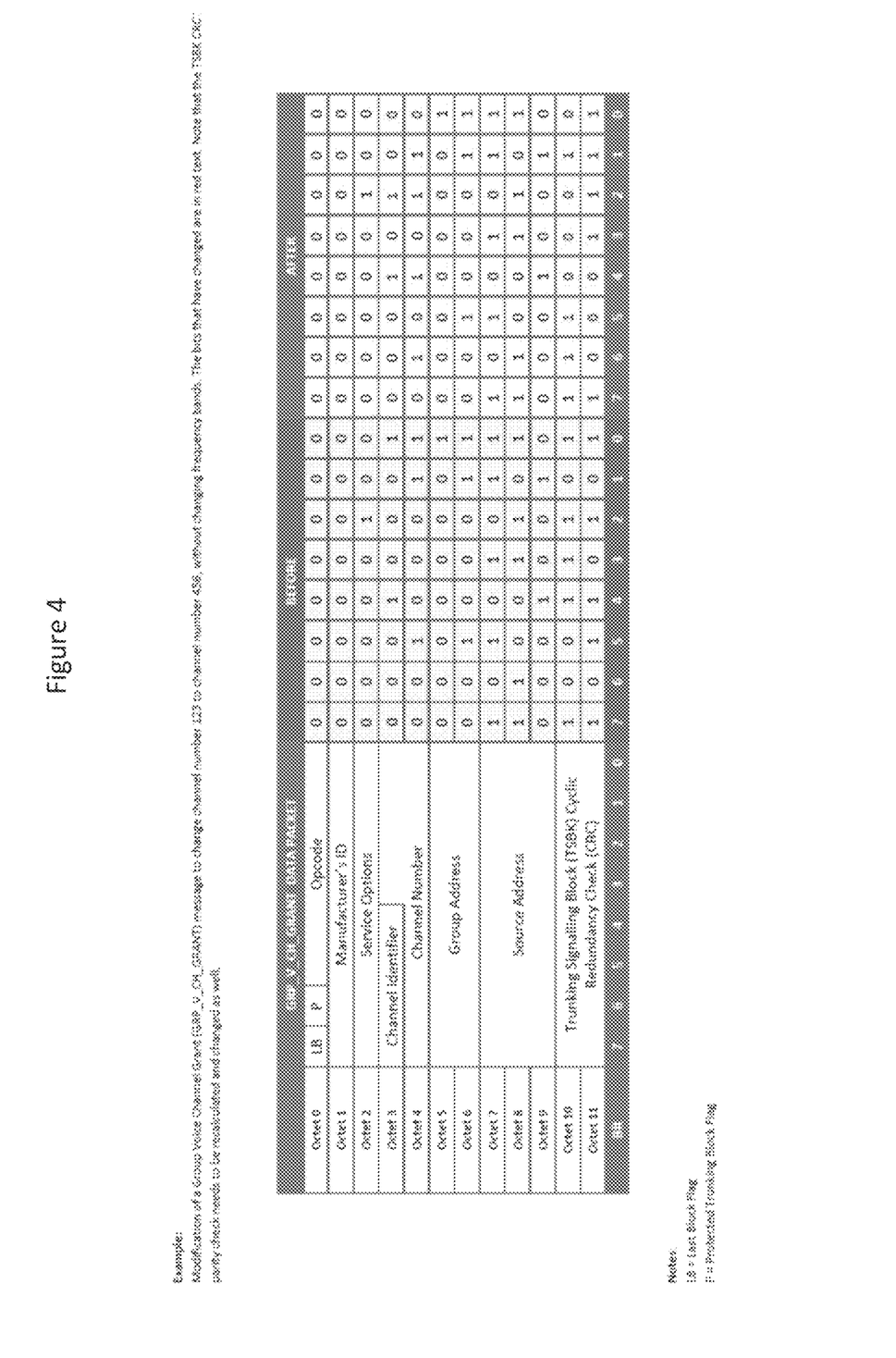
FIG. 4 is an example of modifying the GRP-V_CH_GRANT downlink control channel message modified by the BDA of FIG. 1.

In a preferred embodiment, the BDA 10 modifies the content of the downlink control channel (DCC). All other channels are not demodulated, decoded or manipulated except for filtering, amplification and frequency translation. The BDA 10 continuously listens to and decodes messages of the DCC. The BDA 10 changes the messages of the DCC that are related to the traffic channel information prior to transmission to the radios 200. In one embodiment, these DCC messages relate to traffic channel frequency allocation, talk group operations, unit-to-unit calls, telephone-interconnect calls, and data services. In FIG. 3, messages in the DCC that are modified include: GRP_V_CH_GRANT, GRP_V_CH_GRANT_UPDT, GRP_V_CH_GRANT_UPDT_EXP, UU_V_CH_GRANT, UU_V_CH_GRANT_UPDT, TELE_INT_CH_GRANT, TELE_INT_CH_GRANT_UPDT, SN-DATA_CHN_GNT and SN-DATA_CHN_ANN_EXP. Some of the messages that are modified relate to the manipulation of control channel information including: ADJ_STS_BCST, NET_STS_BCST, RFSS_STS_BCST, SCCB and SCCB_EXP. Some messages are modified that relate to setting the channel identifier parameters for control channel messages that contain this including: IDEN_UP, IDEN_UP_TDMA and IDEN_UP_VU. Bits 4 to 7 of octet 3 in FIG. 4 is one example of channel identifier parameters.

The BDA 10 provides a pool of transmitter/receiver (Tx/Rx) frequency pairs, which are used according to their availability. In one embodiment, there is a maximum of 12 bi-directional channels available in the BDA 10 (1 control channel and 11 traffic channels). If the content of any message of the DCC contains a reference to any stored talk group or subscriber ID, the message is modified to reassign it to an available BDA 10 Tx/Rx channel frequency pair (for example, f7 and f8 in FIG. 7).

In addition to changing specific messages of the DCC, the BDA 10 tunes the donor facing Tx/Rx frequencies of the newly allocated channel to match the frequencies contained in the original control channel message. See FIGS. 5 and 6.

Figure 5:
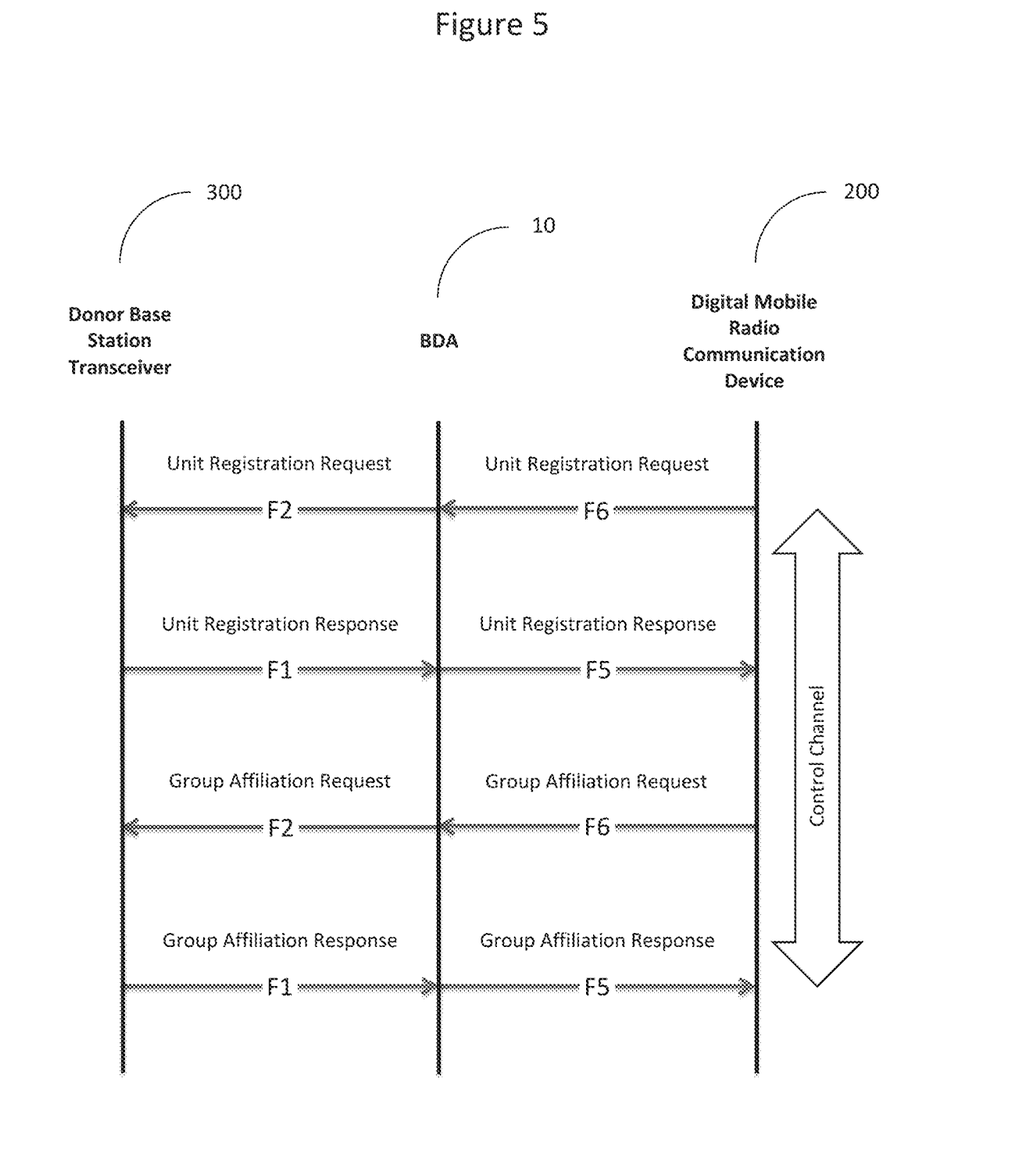
FIG. 5 is a diagram showing the registration process of a digital mobile radio communication device in the digital trunked network, interacting with the BDA of FIG. 1.

Referring to FIG. 5, the registration process of an APCO Project 25 (P25) radio 200 in the network is depicted. This procedure is performed whenever a radio 200 enters or turns on in the coverage area of the BDA 10. It is assumed that the APCO Project 25 (P25) radio 200 and network have been configured in such a way that the mobile 200 uses frequencies {f5, f6} as the control channel frequencies. The BDA 10 does not change the content of the control channels. The BDA 10 seamlessly repeats the DCC and UCC messages in different frequencies (f5 to f1, and f2 to f6).

Figure 6:
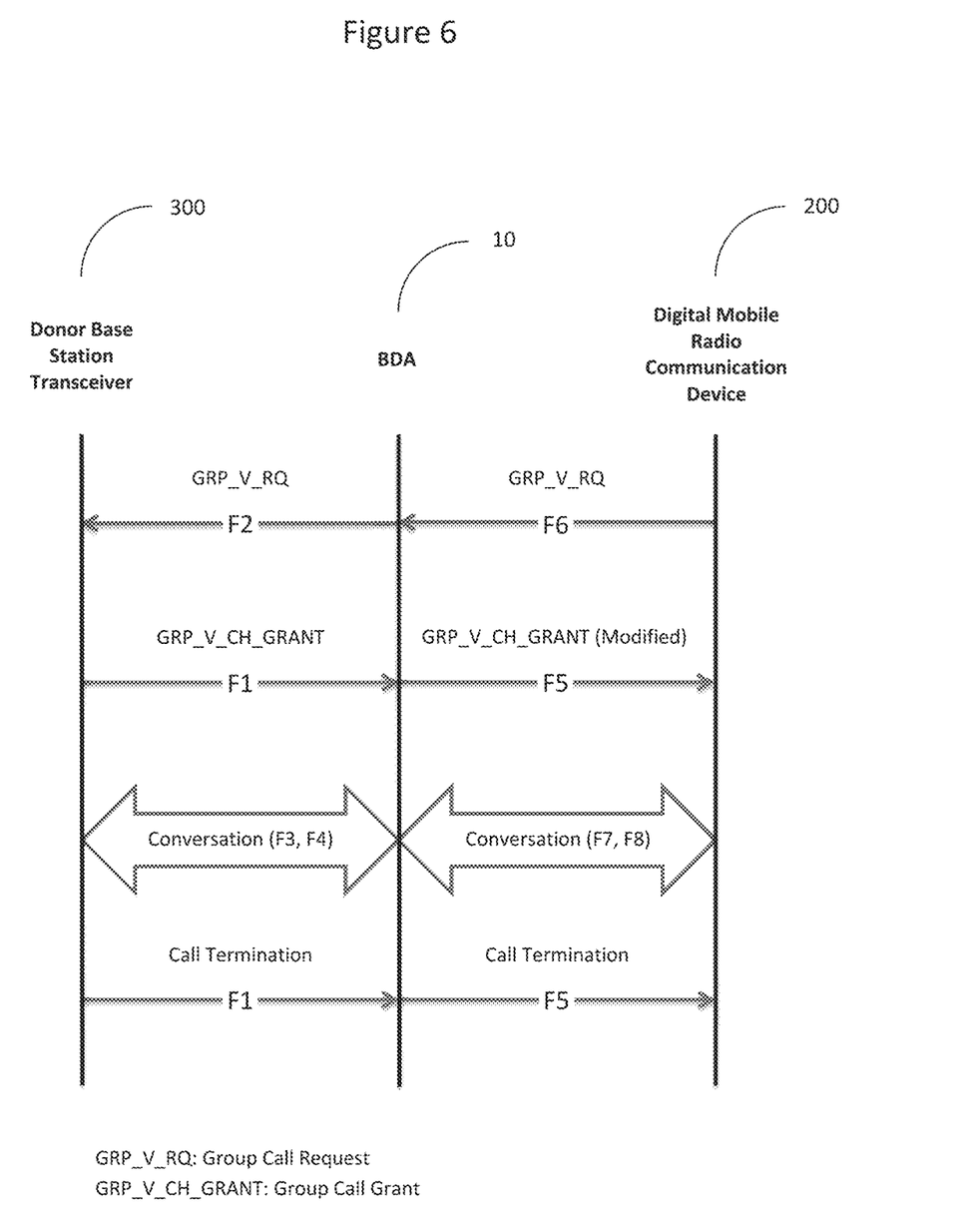
FIG. 6 is a diagram showing a group call process in a talk group when a digital mobile radio communication device in the digital trunked network initiates the group call.

Referring to FIG. 6, the procedure for a group call in a talk group is depicted. When an APCO Project 25 (P25) radio 200 in the coverage area of the BDA 10 initiates the call, the BDA 10 transparently repeats the uplink group call request from the radio 200 to the base station 300 (on a different frequency). The base station 300 then replies to the request by sending a group call grant message back to the radio 200.

Next, the BDA 10 checks the content of the DCC message and if the talk group ID in the grant message corresponds to one of the stored IDs in the memory 41 of the BDA 10, then the BDA 10 will modify the control channel message by replacing the traffic channel frequency information with traffic channel frequency information relevant to the BDA 10.

Modified Control Channel Messages

Referring to FIG. 3, an example of the DCC messages that are modified by the BDA 10 is provided. The messages of the DCC are modified when they are relevant to the coverage area of the BDA 10 (listed in the table of allowed group and individual calls of the BDA 10). These messages are specified in TIA standard: TIA-102.AABC Revision C, Project 25 Trunking Control Channel Messages. These messages include:

Talk group calls: GRP_V_CH_GRANT (short and explicit), GRP_V_CH_GRANT_UPDT and GRP_V_CH_GRANT_UPDT_EXP (only required for networks which require explicit designations), Unit to unit voice calls: UU_V_CH_GRANT (abbreviated and extended) and UU_V_CH_GRANT_UPDT (abbreviated and extended), Telephone interconnect voice calls: TELE_INT_CH_GRANT (short and explicit) and TELE_INT_CH_GRANT_UPDT (short and explicit), Data service channels: SN-DATA_CHN_GNT and SN-DATA_CHN_ANN_EXP, The following obsolete data messages may be handled by the BDA 10 to ensure interoperability with older equipment: IND_DATA_CH_GRANT (abbreviated and extended), GRP_DATA_CH_GRANT (abbreviated and extended), GRP_DATA_CH_ANN, and GRP_DATA_CH_ANN_EXP.

Under certain conditions, the BDA 10 can handle the following messages when they are affected by the operation of the BDA 10. ADJ_STS_BCST (abbreviated and extended formats). The network that the BDA 10 is operating in is configured to include the BDA 10 control channel frequencies in ADJ_STS_BCST messages from the base station 300 to ensure mobiles 200 can roam onto the BDA 10 control channel. The BDA 10 can modify any ADJ_STS_BCST messages that relate to its own control channel frequencies to instead reflect the network control channel frequencies.

The BDA 10 can handle blocked calls if there are no available resources to repeat a channel. A message substitution occurs for all grant messages where there are no resources available at the BDA 10, and message substitution occurs for all subsequent update messages. If a resource of the BDA 10 becomes available part way through a call, the message substitution ceases, and modified update messages begin transmission. To handle this situation, the BDA 10 substitutes a 'deny response' (DENY_RSP) or 'queue response' (QUE_RSP) packet for a group call grant message, with the $53 reason code (no network resources available to support request) or $54 reason code (no RF resources available to support request).

The IDEN_UP, DEN_UP_VU, IDEN_UP_TDMA messages can be handled by the BDA 10. If the BDA 10 is frequency translating to a different frequency band, it modifies these messages to set a new base frequency, Tx/Rx offset and channel spacing.

NET_STS_BCST (abbreviated and extended formats) is modified to refer to the primary control channel of the BDA 10 rather than the control channel of the base station 300.

RFSS_STS_BCST (abbreviated and extended formats) is modified to refer to the primary control channel of the BDA 10 rather than the control channel of the base station 300.

SCCB and SCCB_EXP (short and explicit) are modified to designate the secondary control channel (if present) of the BDA 10.

Firmware Functionality

In one embodiment, the firmware of the BDA 10 allows up to 30 channels for the BDA 10 which defines the service side frequencies between the BDA 10 and the mobiles 200. In another embodiment, the BDA 10 has 12 channels (1 control channel and 11 traffic channels). The BDA 10 service side channel frequencies are different to the donor side base station 300 channel frequencies. The firmware comprises a table of up to 50 IDs (talk groups and individual call IDs) which are permitted by the BDA 10. Each ID entry in the table includes the following fields: ID—The ID number of the subscriber or talk group; Priority—For enabling higher priority IDs to dump lower priority IDs currently in a call if no resources are available; Voice—To determine if the ID is permitted to participate in group and individual voice calls; Data—To determine if the ID can participate in a data call; and EBP—To determine if an ID has the authority to dump a lower priority ID currently in a call (a provision for future features).

The firmware continuously monitors the downlink control channel from the base station 300. If the downlink control channel from the base station 300 contains relevant messages (voice or data call grants) that are addressed to IDs that match the entries in the ID table of the BDA 10, an available traffic channel of the BDA 10 is allocated to the channel request. The downlink control channel message(s) is modified to direct the mobiles 200 in the coverage/service area of the BDA 10 to use the newly allocated traffic channel frequencies of the BDA 10 instead of the original traffic channel frequencies of the base station 300, and the BDA 10 modifies its donor side frequencies for the newly allocated channel to match the corresponding channel frequencies of the base station 300 as indicated in the original control channel message.

The traffic channel data between the base station 300 and the mobiles 200 in the service/coverage area (both uplink and downlink) of the BDA 10 are frequency translated, and all data content is unmodified.

After the call has completed and the traffic channel is released by the base station 300, the traffic channel of the BDA 10 becomes available for reallocation. The traffic channel of the BDA 10 is available for reallocation when traffic channel update messages from the base station cease for the current call.

If a traffic channel grant is made by the base station 300 and there are no available traffic channels in the BDA 10, all grant and subsequent update messages are substituted with other messages, until a traffic channel becomes available or the call ceases.

If a traffic channel of the BDA 10 becomes available part way through a call, the BDA's traffic channel allocation and control channel message modification process begins.

Secondary Control Channels.

In one embodiment, the firmware allows for up to 30 secondary control channel frequencies. If the primary control channel fails, the firmware can switch to a secondary control channel. If the secondary control channel fails while the BDA 10 is using it, the firmware first attempts to use the primary control channel, and then proceeds to the next available secondary control channel (if available) if the primary control channel is still unavailable. If there is no primary or secondary control channel available, the BDA 10 scans all pre-programmed control channel frequencies until a control channel becomes available.

The firmware has the ability to automatically learn the critical parameters of the base station 300 after the base station control channel frequencies have been configured and are being monitored by the BDA 10. These parameters are extracted from the downlink control channel messages and such messages include: Transmit Offset (IDEN_UP, IDEN_UP_VU, IDEN_UP_TDMA), Channel Spacing (IDEN_UP, IDEN_UP_VU, IDEN_UP_TDMA), Base Frequency (IDEN_UP, IDEN_UP_VU, IDEN_UP_TDMA), WACN ID (NET_STS_BCST), System ID (NET_STS_BCST), Secondary control channel frequencies (SCCB), System time (TIME_DATE_ANN), Traffic Channel frequencies, Adjacent site information (ADJ_STS_BCST), Protocol level parameters such as 5 or 6 micro-slot time slot length or TSBK format (single, double or triple).

The BDA 10 provides a graphical user interface (GUI) for interaction with a user. The GUI has a page that contains all the necessary fields and settings to configure the functionality of the BDA 10. The list of group and individual call IDs in the firmware are able to be input as a range or individually. Each entry in the list is able to be easily bypassed by means of a disable check box. The list has an option to bypass all IDs by means of an allow all check box. In this mode, all calls will be permitted by the BDA 10 with frequency translation. The list of base station 300 primary and secondary control channel frequencies is editable via the GUI. The preferred control channel can be selected. The control channel which is in use is indicated. The list of control and traffic channels of the BDA 10 is editable via the GUI. All control and traffic channel frequencies in the GUI shall be specifiable down to 1 Hz precision but in one embodiment are displayed and edited in MHz.

The BDA 10 also provides a Command Line Interface (CLI). All parameters of the BDA 10 can be modified by CLI.

Figure 2:
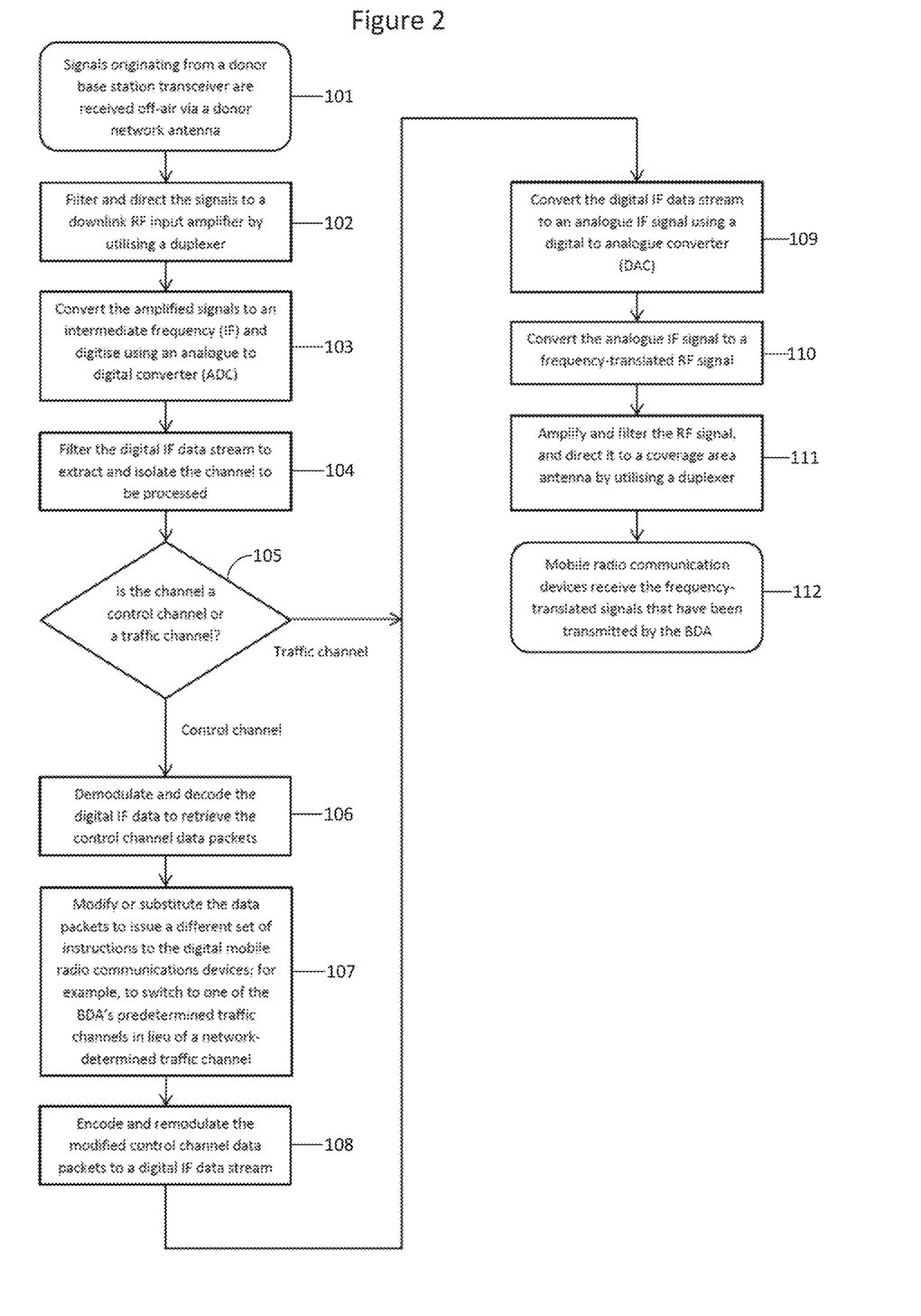
FIG. 2 is a flow chart of a method for extending radio coverage for digital mobile radio communication devices on a trunked network using a digital modulation scheme for the downlink path carried out by the BDA of FIG. 1.

Referring to FIG. 2, the donor network antenna of the BDA 10 receives (101) radio signals originating at a donor base station 300 off-air. The BDA 10 filters (102) and directs the signal to a downlink RF input amplifier 13 by using a duplexer 40. The BDA 10 converts (103) the amplified signals to an intermediate frequency (IF) using a RF/IF converter 14 and digitizes using an analogue to digital converter (ADC) 21. The BDA 10 filters (104) the digital IF data stream to extract and isolate the channel to be processed by the FPGA with local controller (CPU) and firmware 22. A determination is made (105) depending on the configuration of the channel module being used to process the signal. If the channel module is configured as a control channel, the digital IF data is demodulated (106) and decoded to retrieve the control channel data packets (messages). The control channel data packets are modified (107) or substituted to issue a different set of instructions to the digital mobile radio communications devices 200. An example is to switch to one of the BDA's predetermined traffic channels in lieu of a network-determined traffic channel. The modified control channel data is encoded (108) and remodulated to a digital IF data stream.

Next, and also if the channel module is configured as a traffic channel, the digital IF data stream is converted (109) to an analogue IF signal using a digital to analogue converter (DAC) 23. The analogue IF signal is converted (110) to a frequency-translated RF signal by the IF/RF converter 15. The RF output amplifier 16 amplifies (111) and filters the RF signal and directs it to a coverage area antenna 12 by using a duplexer 43. The mobile radio communications devices 200 receive the frequency-translated signals that have been transmitted by the BDA 10.

Referring to FIG. 4, an example of modifying a Group Voice Channel Grant (GRP_V_CH_GRANT) downlink control channel message by the BDA 10 is depicted. The BDA 10 changes the channel number 123 to channel number 456 without changing frequency bands in the GRP_V_CH_GRANT message. The bits that are changed are bits 0 and 2 of Octet 3, bits 0, 2, and 4 to 6 of Octet 4, bits 0 to 6 of Octet 10, bits 1 and 3 to 5 or Octet 11. The TSBK CRC parity check is recalculated and changed also. The original content of the control channel message is shown in the BEFORE columns, and the modified content is shown in the AFTER columns.

Although an embodiment of the invention has been described in relation to the APCO Project 25 (P25) digital modulation protocol, it is envisaged that the invention can be used with other digital modulation protocols including digital mobile radio (DMR) and digital private mobile radio (dPMR) and Terrestrial Trunked Radio (TETRA).

Although an embodiment of the invention has been described comprising an FPGA with local controller (CPU) and firmware, an Application-Specific Integrated Circuit (ASIC) or microprocessor may be used instead.

Unless specified to the contrary, any and all components herein described are understood to be capable of being manufactured and, as such, may be manufactured together or separately.

Moreover, in interpreting the disclosure, all terms should be interpreted in the broadest reasonable manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilised to distinguish between distinct elements.

It is therefore to be understood that numerous modifications may be made to the illustrative examples and that other arrangements may be devised without departing from the spirit and scope of the technology.

The invention claimed is:

1. A method for extending radio coverage for a first set of digital mobile radio communication devices from a plurality of digital mobile radio communication devices, the first set of digital mobile radio communication devices operating on a first frequency from a plurality of frequencies, each of the plurality of frequencies being allocated to a respective set of digital mobile radio communication devices from the plurality of digital mobile radio communication devices by a trunked network using a digital modulation scheme, the trunked network including a donor base station and a bi-directional repeater device, the method comprising:

analysing signals of a downlink control channel transmitted using the first frequency allocated to the first set of digital mobile radio communication devices, in order to identify control channel messages from the signals of the downlink control channel that relate to traffic channel information; and modifying the control channel messages of the downlink control channel that relate to traffic channel information and transmitting the modified control channel messages to the first set of digital mobile radio communication devices in order to change an operating frequency of the first set of digital mobile radio communication devices from the first frequency to use a second frequency from a predetermined set of frequencies that are repeatable by the repeater device, wherein the second frequency operating between the first set of digital mobile radio communication devices and the repeater device is different from the first frequency that is used for transmitting the signals from the donor base station to the repeater device.

2. The method according to claim 1, wherein the control channel messages of the downlink control channel includes: Adjacent Status Broadcast, Group Voice Channel Grant, Group Voice Channel Grant Update, Group Voice Channel Grant Update Explicit, Identifier Update, Identifier Update For TDMA, Identifier Update For VHF/UHF, Network Status Broadcast, RFSS Status Broadcast, Secondary Control Channel Broadcast, Secondary Control Channel Broadcast Explicit, Unit To Unit Voice Channel Grant, Unit To Unit Voice Channel Grant Update, Telephone Interconnect Voice Channel Grant, Telephone Interconnect Voice Channel Grant Update, SNDCP Data Channel Grant, or SNDCP Data Channel Announcement.

3. The method according to claim 1, wherein the repeater device is a bi-directional amplifier (BDA).

4. The method according to claim 1, further comprising storing a predetermined set of talk group and subscriber identities in the repeater device.

5. The method according to claim 1, further comprising periodically broadcasting control channel frequencies that are available for roaming purposes.

6. The method according to claim 1, wherein the repeater device has a maximum of 12 bi-directional channels including 1 control channel and 11 traffic channels, wherein at least one of the 11 traffic channels connects to the donor base station not the plurality of digital mobile radio communication devices.

7. The method according to claim 1, wherein the control channel messages that relate to traffic channel information are control channel messages that relate to traffic channel frequency allocation, talk group operations, unit-to-unit calls, telephone-interconnect calls, and data service requests, wherein the control channel messages are transmitted on a different frequency from the changed operating frequency of the digital mobile radio communication devices and from a traffic channel between the donor base station and the repeater device.

8. The frequency translating bi-directional amplifier of claim 1, wherein the control channel messages are broadcast over a first channel by the donor base station, and are retransmitted after modification over a second channel by the repeater device.

9. The bi-directional amplifier (BDA) of claim 1, further comprising:
a first traffic control channel carrying the traffic control messages between the BDA and the base station, the first traffic control channel having an uplink frequency and a downlink frequency, and
a second traffic control channel carrying the traffic control messages between the BDA and the radio device, the second traffic control channel having an uplink frequency and a downlink frequency, and
wherein the uplink frequency and the downlink frequency of the first traffic control channel are different from the uplink frequency and the downlink frequency of the second traffic control channel.

10. The bi-directional amplifier (BDA) of claim 1, wherein the BDA transmits the traffic control messages to the radio device to assign a frequency of the second set of frequencies for traffic data packets of the radio device.

11. The bi-directional amplifier (BDA) of claim 1, wherein the modified control channel messages are transmitted to the first set of digital mobile radio communication devices on the second frequency.

12. A frequency translating bi-directional amplifier for extending radio coverage for a first set of digital mobile radio communication devices from a plurality of digital mobile radio communication devices, the first set of digital mobile radio communication devices operating on a first frequency of a plurality of frequencies, the first frequency of the plurality of frequencies being allocated to the first set of the plurality of digital mobile radio communication devices by a trunked network using a digital modulation scheme, comprising:
a field programmable gate array (FPGA) with local controller (CPU) and firmware configured to analyse signals of a downlink control channel of a donor base station transmitted using the first frequency allocated to the first set of digital mobile radio communication devices in order to identify control channel messages of the downlink control channel from the signals that relate to traffic channel information, and modify the control channel messages of the downlink control channel that relate to traffic channel information; and
an antenna to transmit the modified control channel messages to the digital mobile radio communication devices in order to change an operating frequency of the first set of digital mobile radio communication devices from the first frequency to use a second frequency from a predetermined set of frequencies that are repeatable by the bi-directional amplifier,
wherein the second frequency operating between the first set of digital mobile radio communication devices and the bi-directional amplifier is different from the first frequency that is used for transmitting the signals from the donor base station to the bi-directional amplifier of the trunked network.

13. The frequency translating bi-directional amplifier according to claim 12, further comprising a memory configured to store a predetermined set of talk groups and subscriber identification numbers.

14. The frequency translating bi-directional amplifier according to claim 12, further comprising firmware configured to continuously monitor the downlink control channel from the donor base station.

15. The frequency translating bi-directional amplifier according to claim 12, wherein the FPGA with local controller (CPU) and firmware modifies the control channel messages of the downlink control channel that relate to traffic channel information including: GRP_VCH_GRANT, GRP_V_CH_GRANT_UPDT, GRP_V_CH_G-RANT_UPDTEXP, UU_V_CH_GRANT, UU_V_CH_G-RANT_UPDT, TELE_INT_CH_GRANT, TELE_INT_CH_GRANTUPDT, SN-DATA_CHN_GNT and SN-DATA_CHN_ANN_EXP.

16. The frequency translating bi-directional amplifier of claim 12, wherein the operating frequency between the digital mobile radio communication devices and the bi-directional amplifier includes at least one first traffic frequency and the operating frequency between the donor base station and the bi-directional amplified includes at least one second traffic frequency, and
wherein the modified control messages are transmitted on a control channel frequency that is different from the at least one first traffic frequency and the at least one second traffic frequency.

17. The frequency translating bi-directional amplifier according to claim 12, wherein the modified control channel messages are transmitted to the first set of digital mobile radio communication devices on the second frequency.

* * * * *